United States Patent [19]
Barrington

[11] Patent Number: 5,133,419
[45] Date of Patent: Jul. 28, 1992

[54] HYDRAULIC SHOCK ABSORBER WITH NITROGEN STABILIZER

[75] Inventor: Burchus Q. Barrington, Duncan, Okla.

[73] Assignee: Halliburton Company, Duncan, Okla.

[21] Appl. No.: 641,981

[22] Filed: Jan. 16, 1991

[51] Int. Cl.⁵ .......................... E21B 17/07; F16F 9/00
[52] U.S. Cl. .................................. 175/321; 166/242; 464/26
[58] Field of Search ............... 175/322, 297, 306, 321; 166/243, 242; 464/26, 28; 188/297

[56] References Cited

U.S. PATENT DOCUMENTS

| | | | |
|---|---|---|---|
| 2,577,599 | 12/1951 | Bethancourt | 73/151 |
| 3,714,831 | 2/1973 | Quichaud et al. | 73/431 |
| 3,998,443 | 12/1976 | Webb | 464/26 X |
| 4,055,338 | 10/1977 | Dyer | 464/26 X |
| 4,628,995 | 12/1986 | Young et al. | 166/113 |
| 4,693,317 | 9/1987 | Edwards et al. | 166/378 |
| 4,817,710 | 4/1989 | Edwards et al. | 166/242 |
| 4,844,181 | 7/1989 | Bassinger | 175/321 X |

Primary Examiner—Terry L. Melius
Attorney, Agent, or Firm—James R. Duzan; Robert M. Hessin

[57] ABSTRACT

A shock absorber device for inclusion in a tool string to provide rapid shock dissipation for shock forces traveling up or down the string. The device includes a tubular mandrel and an outer casing that forms an annular chamber therearound. At least one annular piston and one or more metering sleeves are formed integral with the outer casing and function to divide the annular chamber into a plurality of annular chambers that are filled with either nitrogen gas or silicone oil under selected pressures. Thus, the mandrel supports the lower tool string resiliently due to the fluid supported annular pistons such that any shock wave traveling along the tool string will be rapidly dissipated at the fluid piston interfaces.

21 Claims, 4 Drawing Sheets

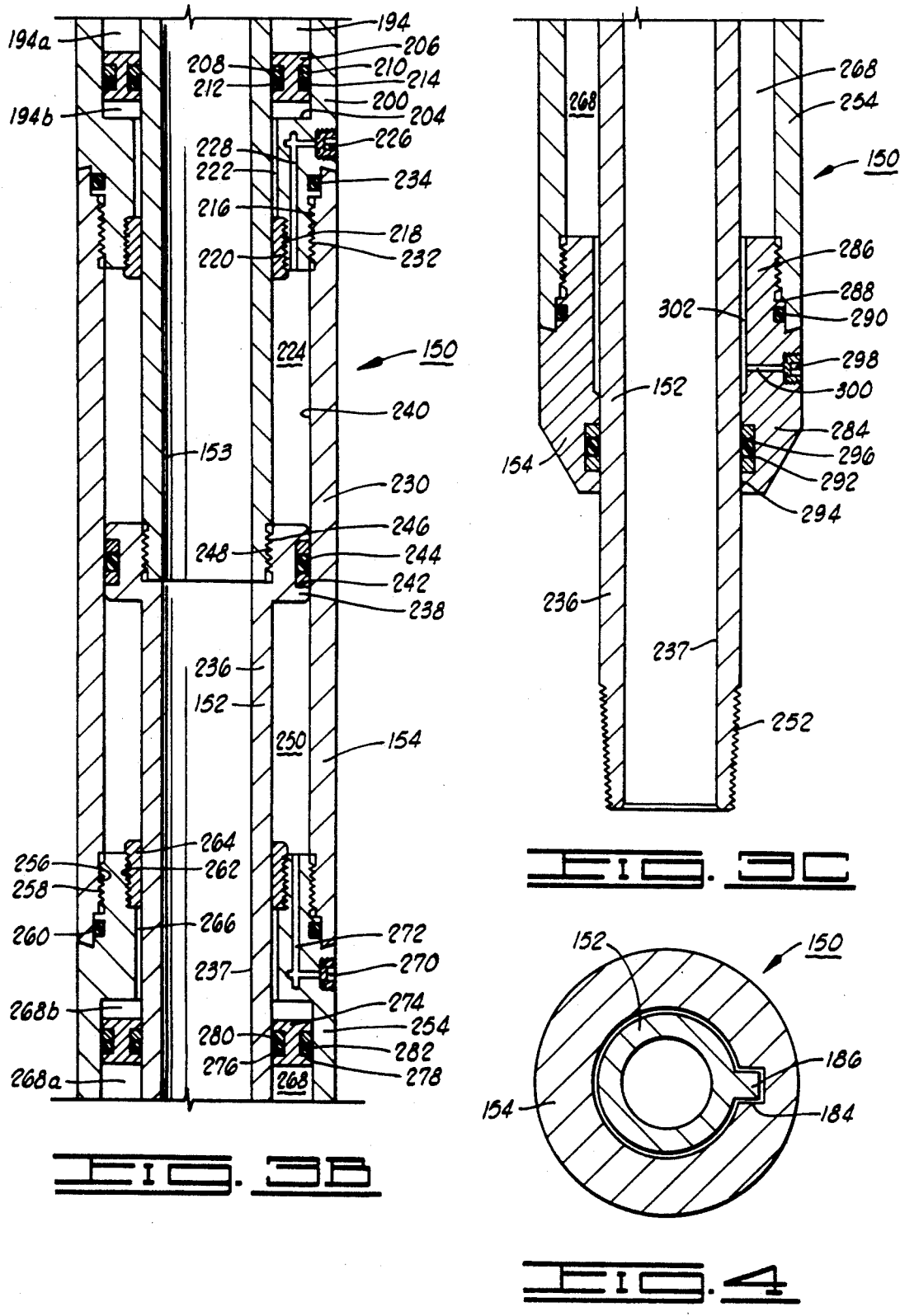

HYDRAULIC SHOCK ABSORBER WITH NITROGEN STABILIZER

BACKGROUND OF THE INVENTION

1. Field of the Invention

The invention relates generally to shock absorbers of the type that may be inserted in a drill or tubing string for the purpose of isolating downhole explosive shock and, more particularly, but not by way of limitation, it relates to an improved type of shock absorber for isolating the jarring effect from perforator jets located either upward or downward thereby to protect the delicate instrumentation of the pressure recording gauges.

2. Description of the Prior Art

A number of shock absorber devices have been devised for isolating vibrations or explosive energy from more sensitive instruments down within an oil well borehole. U.S. Pats. No. 4,817,710 and No. 4,693,317, related applications, teach a borehole shock absorber that is used for guarding against both longitudinal and radial shock as it effects a gauge carrier or the like. U.S. Pat. No. 2,577,599 is an early teaching of a shock proof case providing wireline support of an instrument housing assembly through a series of resilient elastomeric isolation pads.

U.S. Pat. No. 3,714,831 exemplifies the types of device that function to carry a measuring instrument suspended within such as a drill collar section that is designed to receive the instrument. Once again, an elastomeric body or series of annular bodies disposed between the instrument and the drill-collar frame provide reduced vibration suspension of the measuring instrument. This type of device also allows for central passage of drilling fluid through the drill collar simultaneous with sensing operations. A U.S. Pat. No. 4,628,995 discloses a carrier for supporting pressure gauges on a tool string while providing seating for one or more pressure gauges. This device utilizes a restricted flow passageway that impedes the flow of hydraulic well fluid under the effect of the pressure surge at detonation of a perforator, and subsequent expansion of the fluid pressure in an enlarged bore section damps the pressure surge to safely isolate the pressure-sensitive components.

Therefore, it is an object of the present invention to provide rapid damping of the effects of the shock forces produced by jet detonation that travel either upward or downward relative to the tool string.

It is also an object of the invention to provide a shock isolation mechanism that safeguards against shock generation either above or below a preselected point in the tool string.

It is still another object of the present invention to greatly reduce or eliminate sudden shock loading requirements thereby to protect delicate instrumentation in the tool string.

Finally, it is an object of the present invention to provide a shock absorber that is capable of very rapid displacement and subsequent shock absorption.

Other objects and advantages of the invention will be evident from the following detailed description when read in conjunction with the accompanying drawings which illustrate the invention.

BRIEF DESCRIPTION OF THE DRAWINGS

FIG. 4 is a section taken along lines 4—4 of FIG. 3A;

Figure 5A:
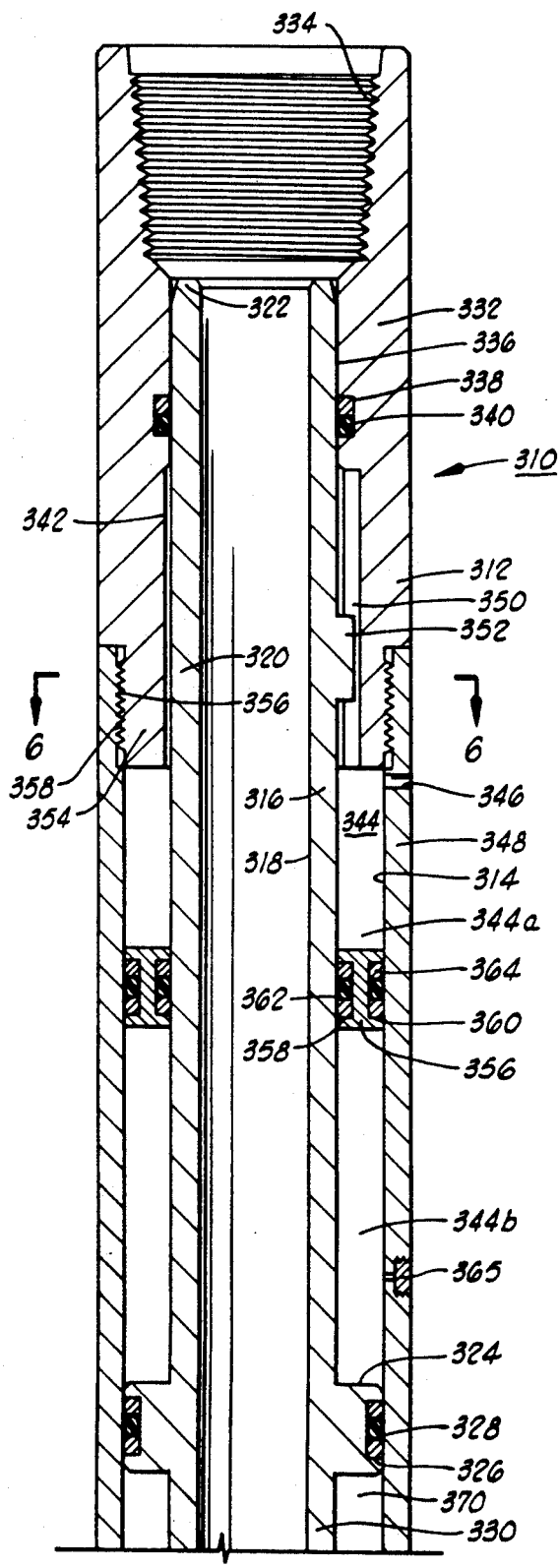
Figure 5B:
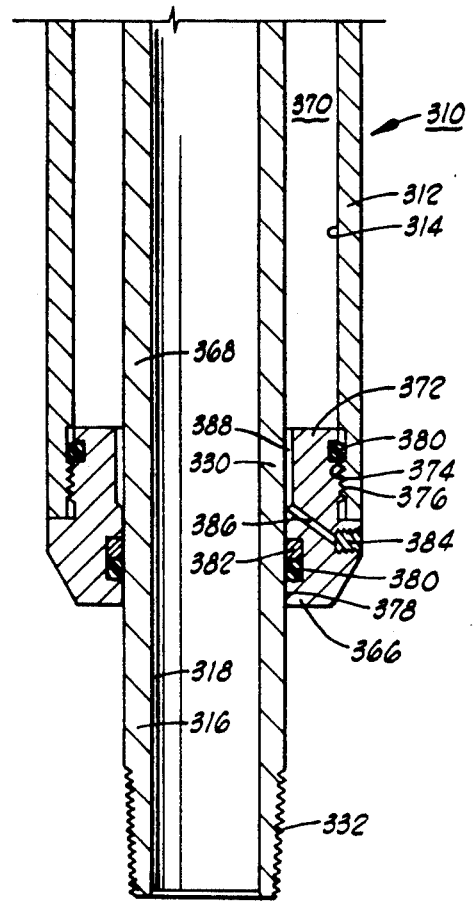
Figure 6:
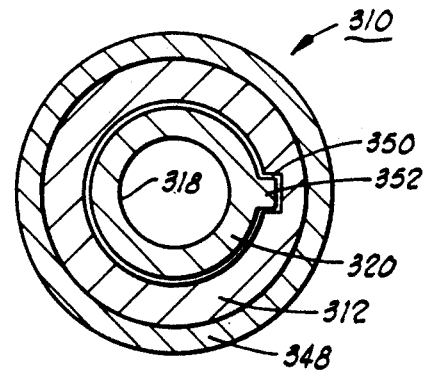

FIG. A is a view in cross section of the upper portion of a second alternative form of shock absorber;

FIG. 5B is a view in section of the bottom portion of the second alternative shock absorber; and FIG. 6 is a section taken along lines 6—6 of FIG. 5A.

DETAILED DESCRIPTION OF THE INVENTION

A shock absorber 10 of first design is illustrated in FIGS. 1A, 1B, 1C and 2. This design uses a pressurized nitrogen differential area at each end of the device 10 to balance two volumes of oil disposed inboard therefrom and separated by a fast acting metering system. The shock absorber device 10 consists of an upper tubing section 12 defining an internal bore 13 as secured co-axially by means of sleeves 14 and metering sleeve 16 to a mid-portion sleeve 18. The mid-portion sleeve 18 is then further connected coaxially by means of a metering sleeve 20 to lower tube casing 22, and a bottom cap 24 is then sealingly connected to provide a slidable, sealed closure around a co-axial inner tubing or mandrel 26.

The mandrel 26 having internal bore 27 consists of an upper tube 28 threadedly connected in-line with a middle tube 30 and a lower tube 32 which extends through the bottom cap 24. Lower tube 26 includes external threads 34 for engaging downhole tubing structure, and the upper tubing section 12 includes internal threads 36 for receiving a complementary threaded tubing member. The central flow way 38 allows fluid passage through the device 10.

The co-axial connecting sleeve 14 includes a first counterbore 40 having threads 42 for secure affixure with external threads 44 of upper sleeve 12. A seated O-ring 46 about the upper collar 48 in counterbore 40 provides a seal relative to upper tube section 12. A metering sleeve section 16 is received within a lower counterbore 50 of sleeve 14. The metering sleeve section 16 includes upper and lower milled surfaces 52 and 54 having respective external threads 56 and 58. Threads 60 formed within counterbore 50 are received over threads 56 as a seated O-ring seal 62 provides sealing affixure. Internal threads 64 formed in the upper end of middle tubing section 18 are then received over threads 58 as a seated O-ring seal 66 provides seal integrity. As shown also in FIG. 2, the metering sleeve 16 includes a longitudinal, rectangular groove 68 which co-acts with a spline 70 on upper tubing 28 to maintain longitudinal alignment of the coacting components. An oil-fill port 72 with screw plug 74 is also provided through metering sleeve 16. A clearance 76 allows for passage of nitrogen gas as charged for pressurizing the chamber 78.

The upper sleeve 14 includes an axial bore 80 having an annular recess 82 for receiving the upper tube 28 slidingly therethrough. A seal 84 consisting of bronze-elastomerbronze combination of successive rings is seated within the annular recess 82. The bronze could be replaced by glass-filled TEFLON ™ rings Thus, a sealed void consisting of clearances 76 and annular chamber 78 is terminated by (see FIG. 1B) an annular shoulder or piston formation 86 about the upper end of middle tube 30. The annular shoulder 86 includes an annular groove 88 that provides seating for a standard type of seal 90, e.g., a bronze-elastomer-bronze ring seal which maintains seal integrity of chamber 78. In most cases the bronze rings may be replaced by TE-FLON ™ rings.

The middle tube 30 and lower tube 32 are joined by means of a similar configuration wherein tube 32 is formed with a piston-like upper annular shoulder 86 which, in turn, is formed with an outer surface annular groove 88 which receives a multi-ring seal 90 therein in contact with the inner wall of lower sleeve 22. Seal 90 may again be the TEFLON-elastomer-TEFLON type of seal combination, or bronze end rings may be used. Another metering sleeve 20 functions to join the middle sleeve 18 to lower sleeve 22 while defining a pair of annular chambers 92 and 94. The metering sleeve 20 is formed with opposite milled ends 96 and 98 having external threads 100 and 102 for receiving the respective internal threads 104 and 106 of middle sleeve 18 and lower sleeve 22. The metering sleeve 20 also includes a central bore 108 through which the middle tube 26 is received with a predetermined clearance 110. A threaded counterbore 112 receives an upper metering ring 114 and, in like manner, a lower threaded counterbore 116 receives a threaded metering ring 118. A screw plug 120 and bore 122 communicating with chamber 94 and the metering system, provide means for input of silicone oil to fill the opposite chambers 92 and 94 and the close clearance spaces 108 between metering sleeves or rings 114 and 118.

Figures 1A, 1B:
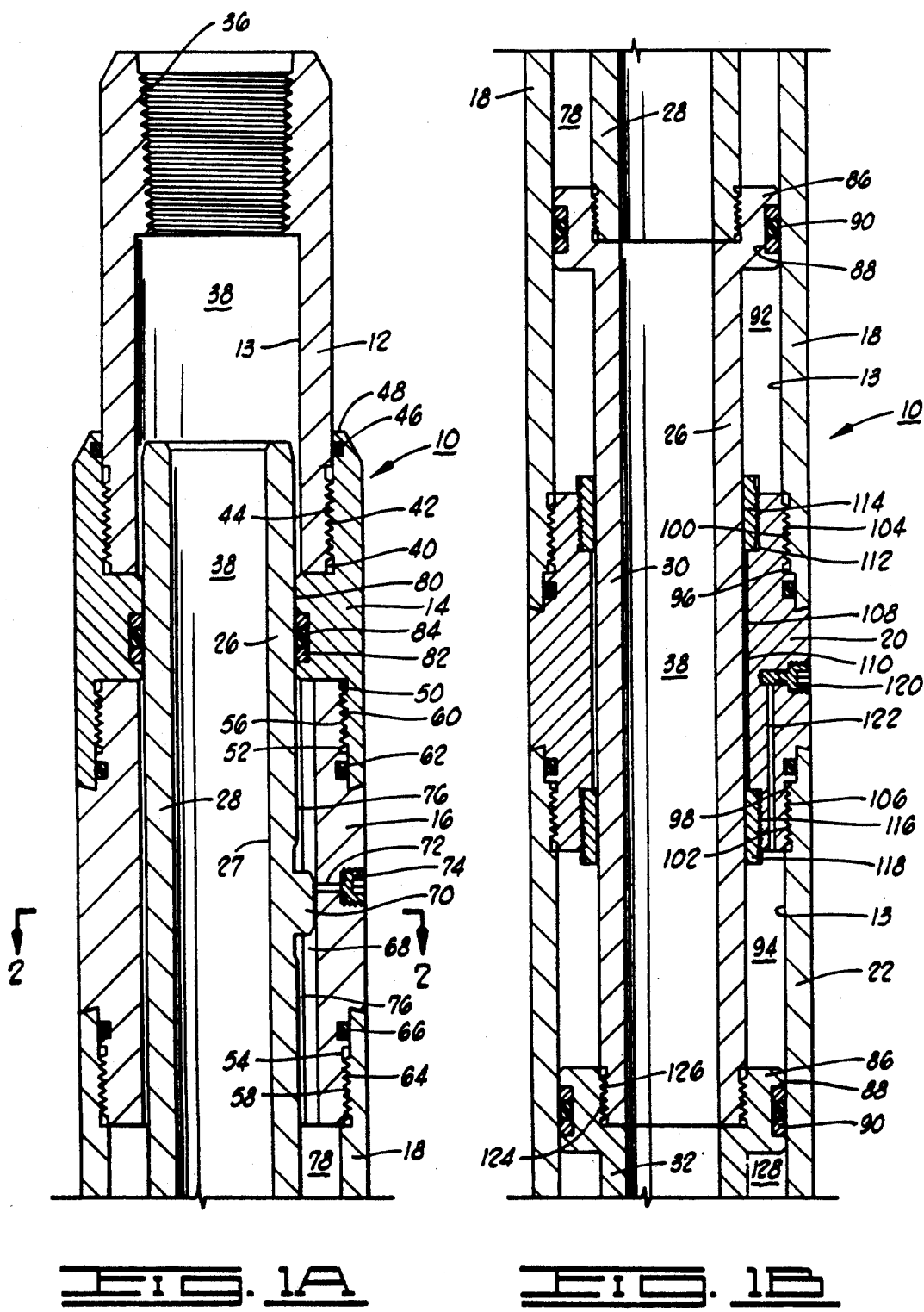
FIG. 1A is a view in cross section of a top portion of a shock absorber.
FIG. 1B is a view in cross section of a mid-portion of a shock absorber.
Figure 1C:
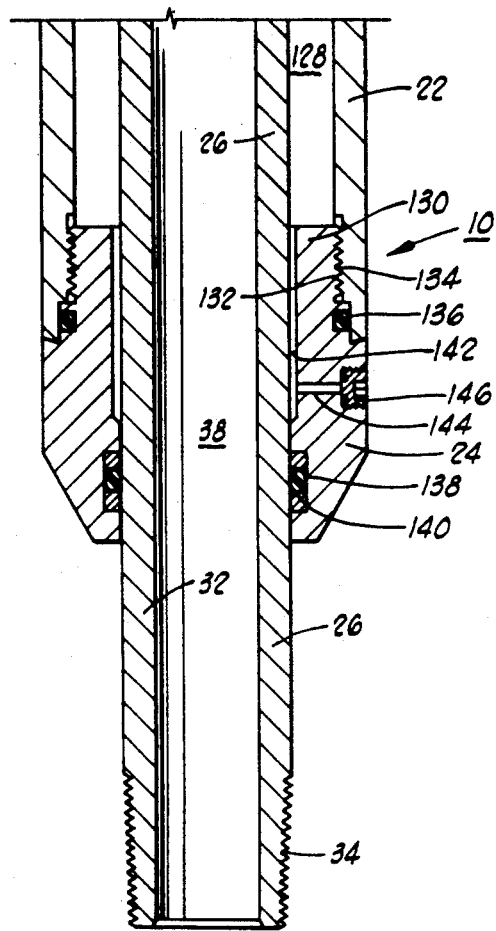
FIG. 1C is a view in cross section of a bottom portion of the shock absorber.
Figure 2:
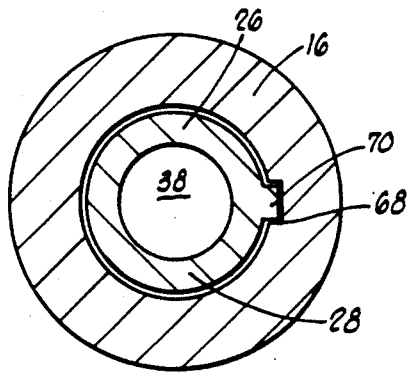
FIG. 2 is a section taken along lines 2—2 of FIG. 1A.
Figure 3A:
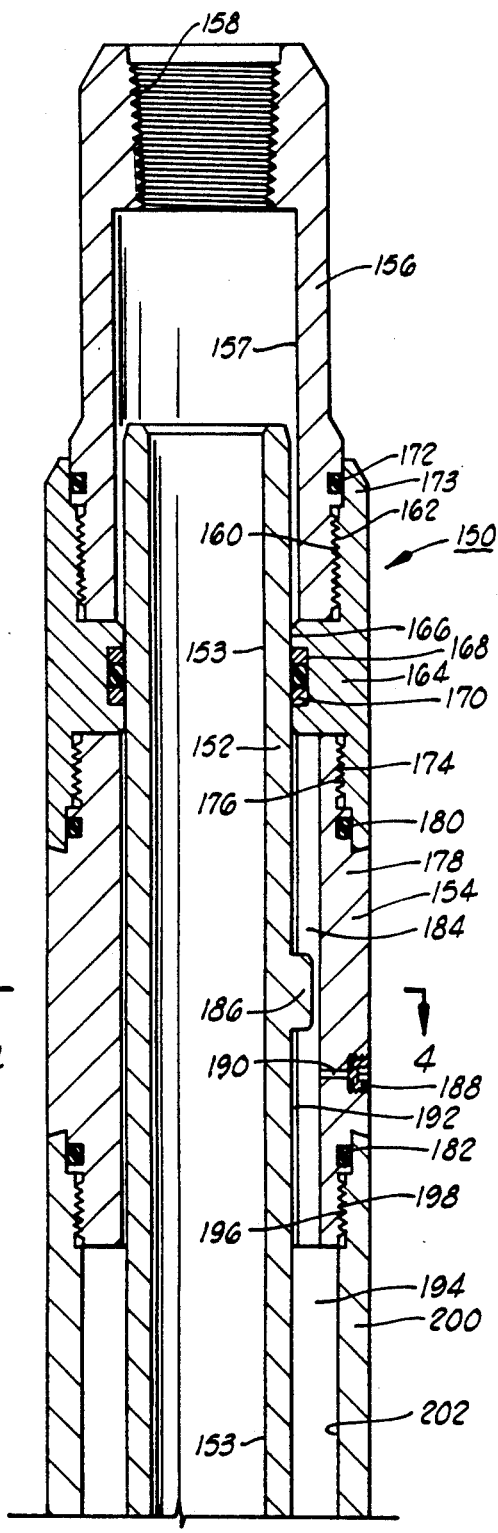
FIG. 3 is a view in cross section of a top portion of an alternative form of shock absorber.
FIG. 3B is a view in cross section of a mid-portion of the alternative form of shock absorber.
FIG. 3C is a view in cross section of the bottom portion of the alternative form of shock absorber.

Referring also to FIG. 1C, the lower tube 32 is secured co-axially with middle tube 30 as the threaded central bore 124 is received over the external threads 126 of middle tube 30. The upset shoulder formation 86 forms yet another chamber 128 as closed off by the threaded collar 130 of lower cap 24. Collar 130 receives external threads for engagement with the internal threads 134 of lower tube 22. A seated O-ring 136 maintains fluid-tight integrity. An annular channel 138 carrying the standard 3-ring seal 140 provides fluid-tight integrity between lower tube 26 and lower cap 24. A counterbore clearance 142 is formed concentrically around lower cap 24 to provide fluid communication between annular chamber 128 and a port 144 as sealed by a screw plug 146.

The opposite end annular chambers 78 and 128, accessible through respective screw plugs 74 and 146 receive a charge of nitrogen under pressure. The internal annular chambers 92 and 94, both accessible through screw plug 120, receive a charge of silicone oil. The nitrogen pressure installed at each end of the tool will depend upon the weight of the tool string below the point of insulation. For instance, if the tool string below the shock absorber device 10 weighed 15,000 pounds and the differential area in the nitrogen chambers 78, 128 was 5 square inches, one would install 3,000 psi nitrogen to balance the weight of the tool string therebelow. The nitrogen pressure acting on each end locates the mandrel 26 in proper position within the outer case 11 so that any forces exerted either upwards or downwards will allow enough relative travel between outer case 11 and mandrel 26 to dissipate the shock. That is, to dissipate the shock without bottoming out either the oil system (chambers 92, 94) or the nitrogen system within chambers 78 and 128.

Shock loads dissipated upward will force the silicone oil to be metered from chamber 94 to chamber 92 with displacement proportional to the upward force. As the silicone oil is metered, the nitrogen pressure on the trip piston 86 increases the pressure of the nitrogen within chamber 78. This rapidly slows the inertia effect of the moving mandrel 26 to absorb the shock load by metering silicone oil and further pressurizing the nitrogen charge. Shock loads acting downward have a somewhat similar function except that the weight of the tool string below the shock absorber device 10 is a plus force that must be added to the shock load and must be taken into consideration when calculation the nitrogen charge to install in the tool, as discussed above.

FIGS. 3A, 3B, 3C and 4 show an alternative form of shock absorber device 150 which is similar to the device 10 except that the silicone oil chambers are isolated from each other and metering of fluid is between the oil and nitrogen chambers. Thus, the shock absorber device 150 consists of an inner mandrel 152 with internal bore 153 received slidably within an outer casing 154.

The outer casing 154 consists of an upper tube section 156 having internal threads 158 for connection into the tubing string. Tube section 156 having internal bore 157 terminates at the lower end with an external thread 160 which is received within a threaded axial bore 162 of a tube section 164. Tube section 164 includes an axial bore 166 having an annular groove 168 retaining a standard 3-ring seal 170, i.e., a TEFLON ™, elastomer combination. The surface 166 and seal 170 provide sealing engagement against mandrel 152. A seated O-ring 172 provides sealing integrity between tube section 156 and an upper collar 173 of tube section 164. The lower section of tube section 164 is also formed with an axial counterbore having threads 174 which engage external threads 176 of a metering section 178. The metering section 178 includes seated O-rings 180 and 182 to maintain fluid-tight integrity, and a longitudinal slot 184 slidingly meshes with a spline 186 formed on the outer surface of mandrel 152 (See FIG. 4). A fluid-tight screw cap 188 and a port 190 provide nitrogen access via metering clearance 192 to the annular void or chamber 194.

The metering sleeve 178 includes external threads 196 around the bottom end for sealed affixure to internal threads 198 of a casing sleeve 200. Actually the casing sleeve 200 is formed with a counterbore inner surface 202 extending downward to a shoulder 204, and this serves to define the annular chamber 194 relative to the mandrel 152.

A free-sliding annular piston ring 206 is disposed within the annular chamber 194. This tends to divide the annular chamber into sections 194a and 194b having annular grooves 208 and 210 on the inner and outer surfaces with respective sealing ring combinations 212 and 214 seated therein. The lower end of casing section 200 is milled to form an external thread 216 while a threaded, axial counterbore 218 receives a metering ring 220 therein. A concentric clearance 222 and metering ring 220 provide communication between chambers 194b and an annular chamber 224. A screw plug 226 and port 228 provide fill access to chamber 224.

A middle casing sleeve 230 having internal threads 232 is secured on external threads 216 of casing section 200 and a seated O-ring 234 provides fluid-tight integrity. The inner mandrel 152 is extended by inclusion of a bottom tube 236 having internal bore 237 and a flange-like piston formation 238 that rides on inner wall 240 of sleeve section 230 as an annular groove 242 carries a 3-ring seal combination 244 in contact with inner wall 240. A threaded axial counterbore formed within piston formation 238 provides means for connecting to external threads 248 of mandrel tube section 152. Actually the piston formation 238 divides the annular chamber into chamber 224 and a lower chamber 250 as the remaining lower structure is essentially a mirror image of the upper structure described heretofore.

Thus, the lower tube section 236 of mandrel 152 extends downward through the lower end cap 154 and includes external threads 252 at the bottom for securing in the tube string. The outer casing 154 is extended by a casing section 254 which is similar to upper casing section 200. That is, an externally threaded milled end 256 is tightly joined to internal threads 258 of casing section 230 as a grooved O-ring 260 maintains seal. A threaded counterbore 262 threadedly receives a metering ring 264 as an annular clearance 266 is provided adjacent the mandrel 152. Clearance 266 then communicates with annular chamber 268. A screw cap 270 and port 272 allow fill access to the silicone oil chamber 250.

The chamber 268 includes a free sliding ring piston 274 which divides chamber 268 into chambers 268a and 268b, size depending upon the positioning of piston 274. The piston 274 is sealingly engaged with the inner and outer walls of the annular chamber 268 by inner and outer annular grooves 276 and 278 which carry respective dual O-ring 280 and 282, an O-ring combination of bronze or TEFLON TM with a more pliable elastomer ring.

Finally, the lower end of the device 150 (FIG. 3C) terminates with a lower end cap 284 of outer casing 154 sealingly secured in position over the mandrel bottom tube 236. End cap 284 is formed with and upper threaded collar 286 tightly received within internally threaded lower end 288 of lower casing section 254. A groove and O-ring 290 provide sealed interconnection. An annular groove 292 within the lower end of bore 294 carries an O-ring seal combination 296 (back-up rings with central O-ring) against mandrel bottom tube 236. A screw plug 298 and port 300 in communication with axial clearance 302 provides access to nitrogen chamber 268.

The alternative design, shock absorber device 150 of FIG. 3, is similar to the design of shock absorber device 10 (FIG. 1) except that the silicone oil chambers are isolated from each other and the metering of the fluid is between the oil and nitrogen chambers. That is, the interior chambers 224 and 250 are charged with silicone oil as filled through respective screw plugs 226 and 270, and nitrogen to predetermined pressure is placed in outer chambers 194 and 268 through respective screw plugs 188 and 298. The floating pistons 206 and 274 located in the respective chambers 194 and 268 provide an interface between nitrogen and silicone oil and on each side the nitrogen charge balances the upward and downward forces. The inertial effect of a sudden shock load will force the mandrel 152 either upward or downward depending upon the particular force direction. In either event, it causes the metering of silicone oil against a floating piston 206, 274 that further pressurizes the respective nitrogen chamber 194, 268. The fast metering of silicone oil working against the respective nitrogen charge quickly dissipates any shock load, i.e., on the order of milliseconds.

Referring to FIGS. 5A, 5B and 6, yet another alternative shock absorber device 310 may be constructed that takes advantage of the external hydrostatic pressure within the surrounding borehole annulus. The device 310 utilizes an external casing 312 that defines an inside bore 314 as it is sealingly affixed in concentric relationship over a mandrel 316 defining an inside bore 318. The mandrel 316 consists of an upper tube section 320 having an upper terminus 322 and being formed into piston 324 at approximately the midpoint. Piston 324 is disposed to ride against inner bore 314 of outer casing 312 and includes an annular groove 326 containing an O-ring seal 328, e.g., the TEFLON/elastomer O-ring combination. Mandrel 316 then extends into a lower tube portion 330 having external threads 332 around the lower end.

Outer casing 312 includes an upper connecting collar 332 having internal threads 334 and defining an internal bore 336 that is tightly received over terminals 322, i.e., the upper end of mandrel tube 320. An annular groove 338 in inner bore 336 provides seating for a dual O-ring seal 340, e.g., TEFLON TM and elastomer, against the outer surface of upper mandrel tube 320. The interior bore of collar section 332 also includes a lower axial counterbore 342 which provides minimal clearance leading down to an annular chamber 344 which communicates with the annulus through a port 346 in casing sleeve 34B. The bore 342 of collar 332 includes a longitudinal slot 350 for receiving an aligning spline 352 (see also FIG. 6) formed on upper mandrel tube 320. The lower end of upper collar 332 is formed with an inset collar 354 having external threads 356 for engaging internal threads 358 of the casing sleeve 348.

The annular chamber 344 is formed within mandrel 316 and casing sleeve 348 as bounded on the ends by inset collar 354 and the piston 324. A free-floating piston ring 356 divides the chamber into chambers 344a and 344b. The piston ring 356 includes inner and outer annular grooves 358 and 360 which provide seating for respective triple O-ring seals 362 and 364. Here again, the triple O-ring seal combination may be the standard type of outer bronze or TEFLON TM square rings boundering an elastomer-type inner ring. Thus piston ring 356 is positioned in accordance with hydrostatic pressure from the annulus as communicated through port 346 and this will determine the piston ring positioning and the relative sizes of annular chambers 344a and 344b. A fill plug 365 allows access to chamber 344b.

A lower end cap 366 secures outer casing 312 in sealed manner over lower mandrel tube 368 to define an annular chamber 370 beneath piston 324. The end cap 366 includes an inset collar portion 372 having external threads 374 for connection within lower internal threads 376 of casing section 312. Lower cap 366 has an axial bore 378 which includes an annular groove 380 seating a double O-ring combination seal 382 for sealing contact around lower mandrel tube 330. An outer, seated O-ring seal 380 provides sealed connection between collar 372 and outer casing 312. Silicone oil input to annular chamber 370 may be effected by means of screw plug 384, port 386 and counterbore clearance 388.

The shock absorber design 310 utilizes approximately equal volumes of silicone oil disposed on opposite ides of piston 324 within lower annular chamber 370 and upper annular chamber 344b. Chamber 344a above the floating piston 356 communicates with the annulus through port 346 such that hydrostatic pressures ranging anywhere from 3,000 psi to 15,000 psi maintain a tight volume of silicone oil balanced around piston 324. In this case, the compressibility of the silicone oil will take the shock load and dissipate the energy quickly between the mandrel 316 and outer casing 312. The silicone oil within bottom chamber 370 would be pressurized by the weight of the tools below the absorber device 310, and the oil volume in chamber 344b above the piston 324 would be pressurized by annulus pressure transmitting force through the mandrel to the bottom oil chamber 370. Thus, a downward force would act on the lower oil chamber volume and an upward force would act against the floating piston 356 which partially balances the upward force by loading the bottom oil chamber 370.

In summary, shock absorbers, to be effective must absorb and dissipate large forces within a matter of milliseconds. Quick oil metering devices that buck a pressurized gas charge are able to provide a fast acting, positive means with which to absorb these tremendous shock loads and protect the delicate instrumentation located above the tool.

The foregoing discloses a novel type of downhole shock absorber device that is capable of very rapid absorption of shock traveling either upward or downward relative to the shock absorber device. The loading to the shock absorbing device is almost instantaneous, within 45/100 of a second. In order to counteract forces traveling at these speeds, the shock absorber must be extremely fast acting as is enabled by a gas pressurized system, a hydraulic system or a combination of both. Silicone oil is selected because it exhibit its a good compressibility characteristic across a wide range of temperature variations as does nitrogen as selected from various gases.

Changes may be made in combination and arrangement of elements as heretofore set forth in the specification and shown in the drawings; it being understood that changes may be made in the embodiments disclosed without departing from the spirit and scope of the invention as defined in the following claims.

What is claimed is:

1. A shock absorber device for interconnection into a drilling tool string, comprising:
   an outer casing defining an interior bore and having upper and lower casing end caps with the upper end cap secured to the tool string, and having upper and lower end annular seals around said interior bore;
   a tubular mandrel upper and lower ends extending coaxially through the outer casing in radially spaced relationship to define an annular chamber while being slidably and sealingly engaged by said upper and lower end annular seals, said tubular mandrel lower end being secured to the tool string;
   metering means connected in said outer casing and restricting flow in said annular chamber between a first chamber and a second chamber;
   first and second annular pistons spaced apart on said tubular mandrel and defining respective first upper and first lower chambers and second upper and second lower chambers;
   oil of selected compressibility filling said first lower chamber and said second upper chamber; and
   a selected gas charged into said first upper chamber and said second lower chamber to a pressure that supports the weight of the tool string beneath the tubular mandrel;
   whereby a shock wave traveling upward or downward along the tool string is rapidly dissipated.

2. A shock absorber device as set forth in claim 1 wherein:
   said oil is silicon oil.

3. A shock absorber device as set forth in claim 1 said gas is nitrogen.

4. A shock absorber device as set forth in claim 2 wherein:
   said gas is nitrogen.

5. A shock absorber as set forth in claim 1 which is further characterized to include:
   a longitudinal groove formed in a section of the outer casing interior bore; and
   a spline formed on a section of said tubular mandrel for slidable engagement within said longitudinal groove to maintain continual alignment.

6. A shock absorber device as set forth in claim 5 wherein:
   said oil is silicone oil and said gas is nitrogen.

7. A shock absorber device as set forth in claim 1 where said metering means comprises:
   a segment of said outer casing which surrounds said mandrel with predetermined close spacing; and
   upper and lower close clearance metering sleeves disposed around said tubular mandrel adjacent respective first lower chamber and second upper chamber.

8. A shock absorber device as set forth in claim 7 which is further characterized to include:
   a longitudinal groove formed in a section of the outer casing interior bore; and
   a spline formed on a section of said tubular mandrel for slidable engagement within said longitudinal groove to maintain continual alignment.

9. A shock absorber device as set forth in claim 8 wherein:
   said oil is silicone oil and said gas is nitrogen.

10. A shock absorber device for interconnection into a drilling tool string, comprising:
    an outer casing defining an interior bore and having upper and lower casing end caps with the upper end cap secured to the tool string, and having upper and lower end annular seals;
    a tubular mandrel having upper and lower ends extending coaxially through the outer casing in radially spaced relationship to define an annular chamber while being slidably and sealingly engaged by said upper and lower end annular seals, said tubular mandrel lower end being secured to the tool string;
    an annular piston disposed on said mandrel about mid-way along the annular chamber to define first and second annular chambers;
    first and second metering means extending from said outer casing and surrounding said mandrel with a predetermined restrictive annular clearance at a position about mid-way of said first and second annular chamber thereby to define first upper and first lower and second upper and second lower chambers;
    oil of selected compressibility filling said first lower chamber and said second upper chamber;
    a selected gas charged into said first upper chamber and second lower chamber to a pressure that supports the weight of the tool string beneath the tubular mandrel; and first and second slidable annular piston rings disposed in the first upper and second lower chambers to maintain separation of the oil and selected gas therein;

whereby shock wave traveling upward or downward along the tool string is rapidly dissipated.

11. A shock absorber device as set forth in claim 10 wherein:
said oil is silicon oil.

12. A shock absorber device as set forth in claim 10 wherein:
said gas is nitrogen.

13. A shock absorber device as set forth in claim 11 wherein:
said gas is nitrogen.

14. A shock absorber as set forth in claim 10 which is further characterized to include:
a longitudinal groove formed in a section of the outer casing interior bore; and
a spline formed on a section of said tubular mandrel for slidable engagement within said longitudinal groove to maintain continual alignment.

15. A shock absorber as set forth in claim 14 wherein:
said oil is silicone oil and said gas is nitrogen.

16. A shock absorber device as set forth in claim 10 wherein said first and second metering means each comprise:
an interior bore formation in said outer casing which surrounds said mandrel with predetermined close spacing; and
a metering sleeve of predetermined close clearance disposed around said mandrel to further limit passage of oil.

17. A shock absorber device as set forth in claim 10 which is further characterized to include:
a longitudinal groove formed in a section of the outer casing interior bore and
a spline formed on a section of said tubular mandrel for slidable engagement within said longitudinal groove to maintain continual alignment.

18. A shock absorber device as set forth in claim 17 wherein:
said oil is silicone oil and said gas is nitrogen.

19. A shock absorber device for interconnection into a drilling tool string, comprising:
an outer casing defining an interior bore and having upper and lower casing end caps with the upper end cap secured to the tool string, and having upper and lower end annular seals;
a tubular mandrel having upper and lower ends extending coaxially through the outer casing in radially spaced relationship to define an annular chamber while being slidably and sealingly engaged by said upper and lower annular seals, said tubular mandrel lower end being secured to the tool string;
an annular piston means affixed on said tubular mandrel and reciprocal within said annular chamber to define first and second annular chambers;
fluid substance of predetermined compressibility disposed in the respective first and second annular chambers;
an annular piston ring movably disposed in said first annular chamber in sealed, sliding contact with both the tubular mandrel and the outer casing interior bore; and
a port formed through the outer casing to allow communication of hydrostatic annulus pressure to the first annular chamber and annular piston ring container therein.

20. A shock absorber device as set forth in claim 19 wherein:
said fluid substance is silicone oil.

21. A shock absorber device as set forth in claim 20 which is further characterized to include:
a longitudinal slot formed in a portion of the outer casing interior bore; an
a spline formed on said tubular mandrel which is reciprocal in the longitudinal slot to maintain alignment of the outer casing and tubular mandrel.

* * * * *